(12) United States Patent
Jeong et al.

(10) Patent No.: US 8,548,224 B2
(45) Date of Patent: Oct. 1, 2013

(54) METHOD FOR INSPECTING MEASUREMENT OBJECT

(71) Applicant: Koh Young Technology Inc., Seoul (KR)

(72) Inventors: Joong-Ki Jeong, Seoul (KR); Yu-Jin Lee, Seoul (KR); Seung-Jun Lee, Seoul (KR)

(73) Assignee: Koh Young Technology Inc., Seoul (KR)

( * ) Notice: Subject to any disclaimer, the term of this patent is extended or adjusted under 35 U.S.C. 154(b) by 0 days.

(21) Appl. No.: 13/679,390

(22) Filed: Nov. 16, 2012

(65) Prior Publication Data

US 2013/0077849 A1    Mar. 28, 2013

Related U.S. Application Data

(62) Division of application No. 12/829,670, filed on Jul. 2, 2010, now Pat. No. 8,369,603.

(30) Foreign Application Priority Data

| Jul. 3, 2009 | (KR) | .................. 10-2009-0060542 |
| Jan. 29, 2010 | (KR) | .................. 10-2010-0008689 |
| Jun. 28, 2010 | (KR) | .................. 10-2010-0060945 |

(51) Int. Cl.
*G06K 9/00* (2006.01)
*G03F 9/00* (2006.01)

(52) U.S. Cl.
USPC ........... 382/147; 382/141; 382/145; 382/149; 382/151; 430/30

(58) Field of Classification Search
USPC ............ 382/141, 145, 147, 149, 151; 430/30
See application file for complete search history.

(56) References Cited

FOREIGN PATENT DOCUMENTS

| JP | 62-265506 | 11/1987 |
| JP | 63-018206 | 1/1988 |
| JP | 63-061104 | 3/1988 |
| JP | 63-106508 | 5/1988 |
| JP | 2002-228597 | 8/2002 |
| JP | 2003-504634 | 2/2003 |
| JP | 2003-279334 | 10/2003 |
| JP | 2007-163498 | 6/2007 |
| KR | 10-2010-0052546 | 5/2010 |

*Primary Examiner* — Christopher Young
(74) *Attorney, Agent, or Firm* — Kile Park Reed & Houtteman PLLC

(57) ABSTRACT

An inspection method for inspecting a device mounted on a substrate, includes generating a shape template of the device, acquiring height information of each pixel by projecting grating pattern light onto the substrate through a projecting section, generating a contrast map corresponding to the height information of each pixel, and comparing the contrast map with the shape template. Thus, a measurement object may be exactly extracted.

10 Claims, 16 Drawing Sheets

METHOD FOR INSPECTING MEASUREMENT OBJECT

CROSS REFERENCE TO RELATED APPLICATION

This application is a divisional application of U.S. patent application Ser. No. 12/829,670, filed on Jul. 2, 2010 (currently pending), the disclosure of which is herein incorporated by reference in its entirety. The U.S. patent application Ser. No. 12/829,670 claims priority from and the benefit of Korean Patent Application No. 2009-0060542 filed on Jul. 3, 2009, Korean Patent Application No. 2010-0008689 filed on Jan. 29, 2010 and Korean Patent Application No. 2010-0060945 filed on Jun. 28, 2010, which are both hereby incorporated by reference for all purposes as if fully set forth herein.

BACKGROUND OF THE INVENTION

1. Field of the Invention

Exemplary embodiments of the present invention relate to a method for inspecting a measurement object and, more particularly, to a method for inspecting a measurement object formed on a printed circuit board.

2. Discussion of the Background

In general, electronic appliances include at least one printed circuit board printed circuit board (PCB), and various kinds of electronic devices are mounted on the printed circuit board.

In order to check the credibility of a substrate having electronic devices mounted thereon, inspecting the mounting status of the electronic devices is required and it is important to setting up a region of a measurement object.

Previously, in order to set up the region of a measurement object, a two dimensional image is captured to be used. However, setting up the region of a measurement object from the two dimensional image is not easy since it is hard to discriminate the measurement object from environments because a device is sensitive to a color and an illuminator. When the dimension of the measurement object is changed, it is hard to discriminate the measurement object. Furthermore, when the image contains a noise, for example, when not only the measurement object but also a pattern or a silk screen pattern is formed on a substrate, it is hard to discriminate the measurement object since a noise may be generated by a camera and the region of the measurement object may be confused with a pad region adjacent to the region of the measurement object. Additionally, a device has been extracted by using a fillet portion of a two dimensional image of the device, but when the fillet of the device is small, there is a limitation in extracting the device using the fillet.

Therefore, a new method for inspecting a three-dimensional shape, which is capable of avoid above mentioned problems, is required.

SUMMARY OF THE INVENTION

Exemplary embodiments of the present invention provide a method for inspecting a measurement object, capable of extracting a measurement object exactly.

Additional features of the invention will be set forth in the description which follows, and in part will be apparent from the description, or may be learned by practice of the invention.

An exemplary embodiment of the present invention discloses an inspection method for inspecting a device mounted on a substrate. The inspection method includes generating a shape template of the device, acquiring height information of each pixel by projecting grating pattern light onto the substrate through a projecting section, generating a contrast map corresponding to the height information of each pixel, and comparing the contrast map with the shape template.

The inspection method may further include acquiring at least one information of a size, a position and a rotation of the device corresponding to the shape template by comparing the contrast map with the shape template.

The projecting section may include a light source, a grating unit converting light generated by the light source into the grating pattern light and a grating transfer unit transferring the grating unit. The projecting section may project the grating pattern light onto the substrate N-times, transferring the grating unit.

The inspection method may further include acquiring visibility information of each pixel of the substrate through N-number of images captured by a camera when the grating pattern light is reflected by the substrate. The contrast map may be defined by a value calculated by multiplying the height information with the visibility information. The visibility information ($V_i(x,y)$) may be a ratio of amplitude ($B_i(x,y)$) to average ($A_i(x,y)$) (or ($V_i(x,y)=B_i(x,y)/A_i(x,y)$)) in intensity of image at each pixel.

The contrast map and the shape template may be compared with each other within a specific tolerance value of the template.

Comparing the contrast map with the shape template may include multiplying a value of zero or one in the shape template, which is allotted according to a coordinate of pixel with a contrast value of a region where the contrast map overlaps with the shape template to get result values, and summing up the result values, determining a position where the sum of the result values becomes maximum to be a position of the device by moving the shape template, and confirming the device is the device corresponding to the shape template when the maximum value is no less than a criterion.

Another exemplary embodiment of the present invention discloses an inspection method for inspecting a device mounted on a substrate. The inspection method includes generating a shape template of the device, acquiring shadow information of each pixel by projecting light onto the substrate in a plurality of directions, generating a shadow map by merging a plurality of shadow information taken in a plurality of directions, and comparing the shadow map with the shape template to acquire at least one information of a size, a position and a rotation of the device.

Acquiring shadow information of each pixel by projecting light onto the substrate in a plurality of directions may include projecting grating pattern light onto the substrate in a plurality of directions N-times, while shifting a phase of the grating pattern light and capturing N-number of images reflected by the substrate.

Acquiring shadow information of each pixel by projecting light onto the substrate in a plurality of directions may further include averaging the N-number of images or summing up images in the N-number of images such that sum of phase differences of the images becomes 360 degrees, to get images in which grating pattern is removed.

Still another exemplary embodiment of the present invention discloses an inspection method for inspecting a device mounted on a substrate. The inspection method includes projecting grating pattern light onto the substrate in a plurality of directions N-times while changing the grating pattern light and capturing N-number of images by a camera, generating visibility maps of the directions by using the N-number of images in each of the directions, acquiring shadow regions of the measurement object from the visibility maps of the directions, and merging the shadow regions of the plurality directions to generate a shadow map.

The inspection method may further include inspecting the measurement object by acquiring at least one information of a size and a position of the device from the shadow map.

The visibility map ($V_i(x,y)$) may be a ratio of amplitude ($B_i(x,y)$) to average ($A_i(x,y)$) (or ($V_i(x,y)=B_i(x,y)/A_i(x,y)$)) in intensity of image at each pixel.

Inspecting the measurement object by acquiring at least one information of a size and a position of the device from the shadow map may include comparing the shadow map and the shape template corresponding to the device within a specific tolerance value.

Comparing the shadow map and the shape template may include comparing the shadow map and the template while moving the shape template from an initial position.

Comparing the shadow map and the shape template may include multiplying a value of zero or one in the shadow template, which is allotted according to a coordinate of pixel with a value of zero or one in the shadow map, which is allotted according a coordinate of pixel of a region where the shadow map overlaps with the shadow template to get result values, and summing up the result values, determining a position where the sum of the result values becomes maximum to be a preliminary position of the device by moving the shadow template, and confirming the device is the device corresponding to the shadow template when the maximum value is no less than a criterion.

Still another exemplary embodiment of the present invention discloses an inspection method. The inspection method includes projecting grating pattern light onto the substrate in a plurality of directions N-times while changing the grating pattern light and capturing N-number of images by a camera, generating visibility maps of the directions by using the N-number of images in each of the directions (N is an integer greater than two), acquiring shadow regions of the directions from the measurement object from the visibility maps of the directions, compensating the shadow regions of the directions, which are acquired, and merging the shadow regions of the directions, which are compensated, to generate a shadow map.

The visibility map ($V_i(x,y)$) may be a ratio of amplitude ($B_i(x,y)$) to average ($A_i(x,y)$) (or ($V_i(x,y)=B_i(x,y)/A_i(x,y)$)) in intensity of image at each pixel.

Compensating the shadow regions of the directions may be performed by multiplying amplitude (($B_i(x,y)$)) with each pixels of the shadow region of the directions, which is acquired.

Compensating the shadow regions of the directions may include setting up a pixel of a shadow regions of the directions to be a shadow when the amplitude (($B_i(x,y)$)) of the pixel is no greater than a criterion that is previously set up.

The inspection method may further include acquiring at least one information of a size and a position of the measurement object from the shadow map.

According to the present invention, wanted device is extracted by using the contrast map on which height of the device is reflected and/or the shadow map of the device. Therefore, the method of the present invention is less sensitive to the color of the device and illumination than the conventional method using two dimensional image (or picture), so that the device may be easily discriminated even when the dimension of the device is changed.

Additionally, the method of the present invention is not affected by noise around the device, which is induced by patterns or silk screen patterns formed around the device, or noise of the device, which is induced by the camera. Even when other device, which may be confused with the device, is mounted, the device is compared with the template so that the device may be clearly discriminated.

Furthermore, the method may clearly discriminate the device even when the fillet of the device is small, since the method does not uses the fillet but the contrast map in discriminating the device.

The shadow map is independent from measurement height range so that information of the device 910, such as a position, a size, a rotation angle, etc., may be acquired regardless of the height of the device, even when the height of the device exceeds the measurement height range of the apparatus for measuring a three-dimensional shape.

Additionally, when the shadow regions of the directions acquired from the visibility map is compensated by the amplitude information, the noise of the shadow region may be minimized to enhance inspection reliability of the measurement object.

Furthermore, when the shadow regions are extracted using the amplitude maps of the directions having less noise than the visibility maps of the directions, a reliability of the shadow region may be enhanced.

Furthermore, a region of a measurement object may be exactly extracted using the visibility map even when the height of the device exceeds the measurement height range of the apparatus for measuring a three-dimensional shape.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE INVENTION

Figure 1:
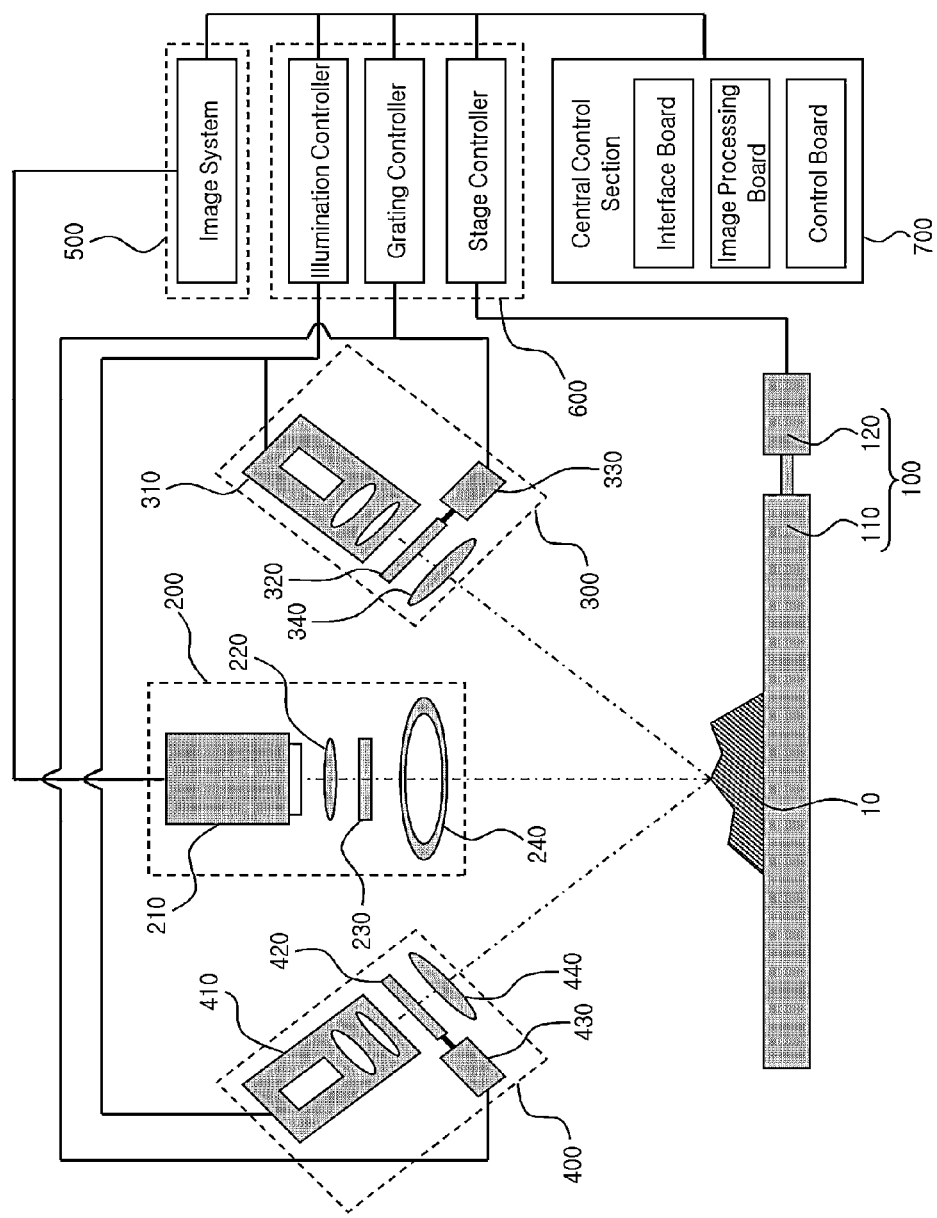
FIG. 1 is a schematic view showing an apparatus for measuring a three-dimensional shape, which may be used for an inspection method for a three dimensional shape according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

FIG. 1 is a schematic view showing an apparatus for measuring a three-dimensional shape, which may be used for an inspection method for a three dimensional shape according to an exemplary embodiment of the present invention.

Referring to FIG. 1, an apparatus for measuring a three-dimensional shape, which may be used for an inspection method for a three dimensional shape according to an exemplary embodiment of the present invention, includes a stage section 100, an image capturing section 200, first and second projecting sections 300 and 400, an image storing section 500, a module control section 600 and a central control section 700.

The stage section 100 may include a stage 110 and a stage transferring unit 120. The stage 110 supports the substrate 10 on which the measurement object 10 is mounted. The stage transferring unit 120 transfers the stage 110. In the present embodiment, the stage 110 transfers the substrate 10 with respect to the image capturing section 200 and the first and second projecting sections 300 and 400, so that a measuring position of the substrate 10 may be changed.

The image capturing section 200 is disposed over the stage 110. The image capturing section 200 receives light reflected on the measurement object 10 to capture an image of the measurement object 10. That is, the image capturing section 200 receives light projected by the first and second projecting sections 300 and 400 and reflected on the measurement object 10 to capture the image of the measurement object 10 for measuring a three-dimensional shape.

The image capturing section 200 may include a camera 210, an imaging lens 220, a filter 230 and a lamp 240. The camera 210 receives light reflected on the measurement object 10 to capture the image of the measurement object 10. For example, a CCD camera or a CMOS camera may be employed as the camera 210. The imaging lens 220 is disposed under the camera 210 to make an image of the measurement object 10 onto the camera 210. The filter 230 is disposed under the imaging lens 220 to filter light reflected by the target object 10 to provide filtered light to the imaging lens 220. For example, the filter 230 may include at least one of a frequency filter, a color filter and intensity a control filter. The lamp 240 is disposed under the filter 230, for example in a circular shape. The lamp 240 may irradiate light onto the measurement object 10 to make an image for a specific purpose such as a two dimensional shape of the measurement object 10.

The first projecting section 300 may be disposed at a first side of the image capturing section 200 such that the first projecting section 300 projects light slantly with respect to the stage 110. The first projecting section 300 may include a first projecting unit 310, a first grating unit 320, a first grating transfer unit 330 and a first focusing lens 340. The first projecting unit 310 may include a light source generating light and at least one lens. The first grating unit 320 is disposed under the first projecting unit 310 to convert the light generated by the first projecting unit 310 into a first grating pattern light. The first grating transfer unit 330 is connected to the first grating unit 320 to transfer the first grating unit 320. For example, a PZT piezoelectric transfer unit or a precise linear transfer unit may be employed as the first grating transfer unit 330. The first focusing lens 340 is disposed under the first grating unit 320 to focus the first grating pattern light generated by the first grating unit 320 onto the measurement object 10.

The second projecting section 400 may be disposed at a second side of the image capturing section 200, which is opposite to the first side, such that the second projecting section 400 projects light slantly with respect to the stage 110. The second projecting section 400 may include a second projecting unit 410, a second grating unit 420, a second grating transfer unit 430 and a second focusing lens 440. The second projecting section 400 is substantially the same as the first projecting section 300 explained above. Therefore, any further explanation will be omitted.

When the first projecting section 300 projects N-number of first grating pattern lights toward the measurement object 10 while the first grating unit 320 is transferred by the first grating transfer unit 330, the image capturing section 200 receives N-number of first grating pattern lights reflected by the measurement object 10 to capture the N-number of first grating pattern lights reflected by the measurement object 10. Likewise, the second projecting section 400 projects N-number of second grating pattern lights toward the measurement object 10 while the second grating unit 420 is transferred by the second grating transfer unit 430, the image capturing section 200 receives N-number of second grating pattern lights reflected by the measurement object 10 to capture the N-number of second grating pattern lights reflected by the measurement object 10. For example, the integer number N is three or four.

In the present embodiment, only the first and second projecting sections 300 and 400 project the first and second grating pattern lights, respectively. However, the number of the projecting section may be more than two. That is, the grating pattern lights may be irradiated toward the target object 10 in various directions to capture various kinds of pattern images. For example, when three projecting sections are disposed at apexes of an equilateral triangle, respectively, three kinds of grating pattern lights may be projected onto the measurement object 10. In this case, the image capturing section 200 is disposed at a center of the equilateral triangle. For example, when four projecting sections are disposed at apexes of a square, respectively, four kinds of grating pattern lights may be projected onto the measurement object 10. In this case, the image capturing section 200 is disposed at a center of the square.

The image storing section 500 is electrically connected with the camera 210 of the image capturing section 200 and receives the pattern images from the camera 210 to store the pattern images. For example, the image storing section 500 includes an image system receiving the N-number of first pattern images and the N-number of second pattern images from the camera 210 to store the N-number of first pattern images and the N-number of second pattern images.

The module control section 600 is electrically connected to the stage section 100, the image capturing section 200, the first projecting section 300 and the second projecting section 400 to control them. The module control section 600 includes, for example, a Z-axis controller, an illumination controller, a grating controller and a stage controller. The Z-axis controller may transfer the image capturing section 200, the first projecting section 300 and the second projecting section 400 along a Z-axis direction for focusing. The illumination controller controls the first and second projecting units 310 and 410, respectively to generate light. The grating controller controls the first and second grating transfer units 330 and 430 to transfer the first and second grating units 320 and 420, respectively. The stage controller controls the stage transferring unit 120 to transfer the stage 110 along an X-axis and a Y-axis direction.

The central control section 700 is electrically connected to the image storing section 500 and the module control section 600 to control the image storing section 500 and the module control section 600. In detail, the central control section 700 receives the N-number of first pattern images and the N-number of second pattern images from the image system of the image storing section 500 to acquire 3D image data of the electronic device 20 by using N-bucket algorithm. The 3D image data includes height information corresponding to points of the substrate 10. Furthermore, the central control section 700 may control the Z-axis controller, the illumination controller, the grating controller and the stage controller of the module control section 600. In order for performing above operation, the central control section 700 may include, for example, an image processing board, a control board and an interface board.

Hereinafter, a method for inspecting a device mounted on a printed circuit board by using an apparatus for measuring a three-dimensional shape, which is described above, will be explained.

Figure 2:
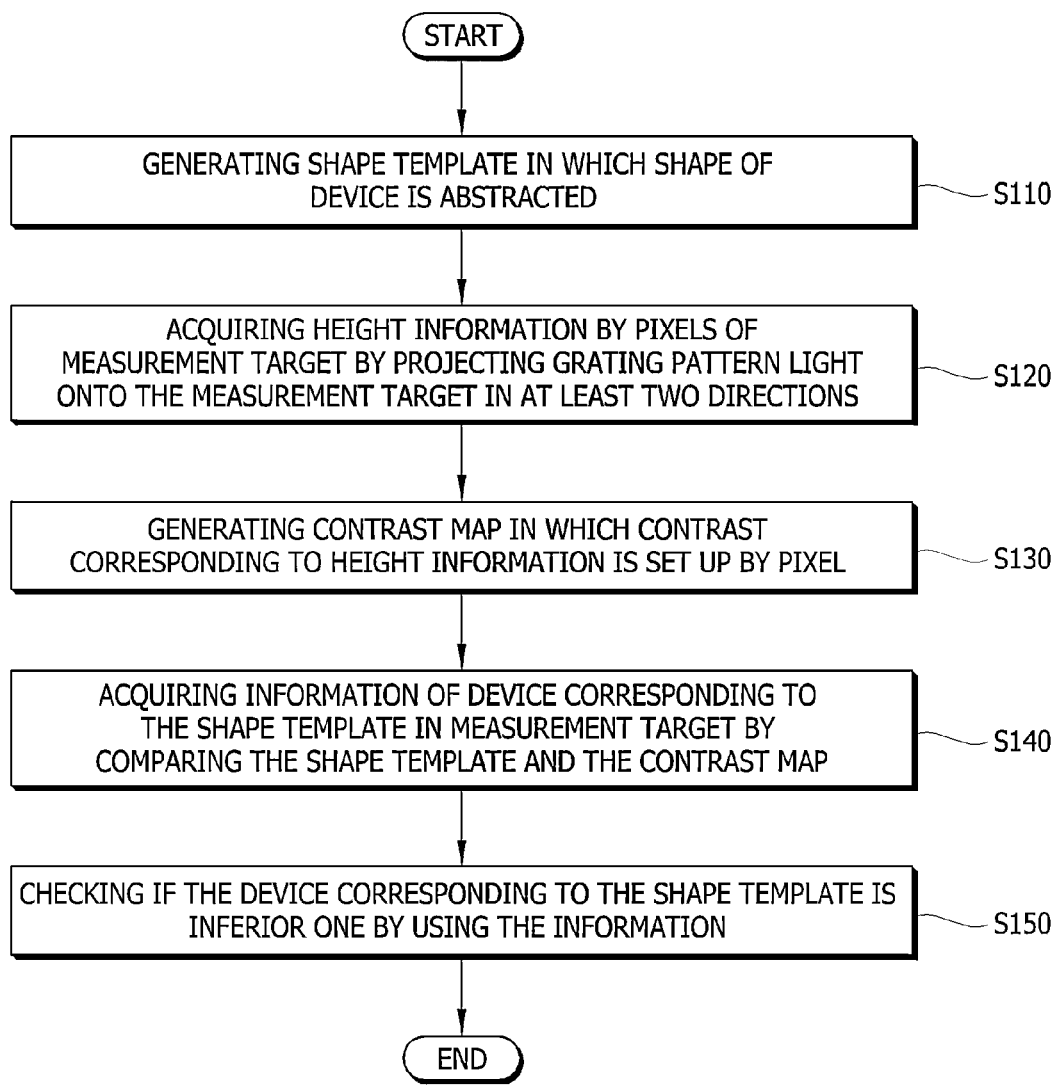
FIG. 2 is a flow chart showing a method for inspecting a three-dimensional shape according to exemplary embodiment of the present invention.
Figure 3:
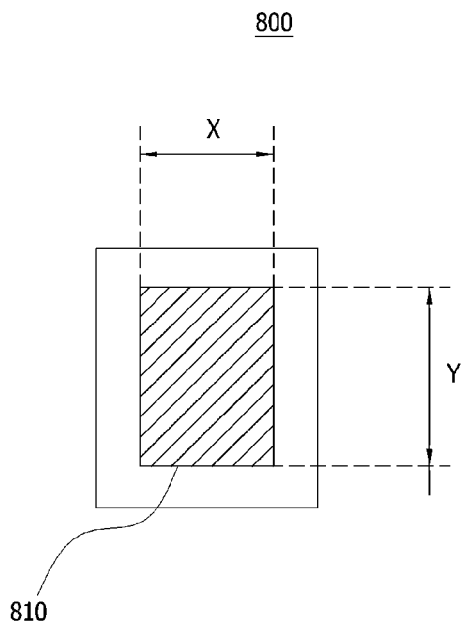
FIG. 3 is a schematic view showing an example of a shape template.

FIG. 2 is a flow chart showing a method for inspecting a three-dimensional shape according to exemplary embodiment of the present invention, and FIG. 3 is a schematic view showing an example of a shape template.

Referring to FIG. 2 and FIG. 3, in order to inspect a device mounted on a printed circuit board, a shape template 800, in which the shape of the device is abstracted, is generated (step S110). The abstracted device 810 may includes a chip having, for example, a hexahedron shape.

For example, in abstracting the device 810, the shape template 800 may be set up in advance such that a first region corresponding to the device 810 may be expressed in white color and a second region not corresponding to the device 810 may be expressed in black color as shown in FIG. 3. In FIG. 3, a hatched region corresponds to the device 810. In this case, the shape template 800 is generated in a digital image, and the first region may be set to be one and the second region may be set to be zero.

The shape template 800 may be defined by a template determinant. That is, the template determinant may determine the shape template 800. For example, when the device 810 is a chip with a hexahedron shape, the template determinant may include a planar area of the chip. In detail, the template determinant may include a width X of the chip and a length Y of the chip, and the shape template 800 may be defined by the template determinant having the width and the length of the chip.

Then, height information is acquired by pixels of the measurement target by projecting grating pattern light onto the measurement target in at least two directions (step S120).

The height information acquired by pixels of the measurement target may be calculated from data obtained by measuring the measurement target, for example, by using the apparatus for measuring a three-dimensional shape in FIG. 1.

Then, a contrast map, in which a contrast corresponding to the height information is set up by pixels, is generated (step S130). Pixels of a comparison target device (Hereinafter, referred to as "target device") mounted on the measurement target may be set up to have greater contrast value when a height of the pixels becomes greater in the height information. Therefore, the contrast map is generated such that a region where the target device is positioned is brighter than a region where the target device is not positioned.

In this case, the contrast map is generated according to the height information. Therefore, the contrast map is independent from a color of the target device, or a character or a figure printed on the target device. Furthermore, the contrast map is independent from a color, a character or a figure of environment of the target device. That is, the contrast map represents only gray scale of the target device according to height of the target device. Therefore, the shape of the target device may be extracted more exactly in comparison with a conventional two dimensional image.

On the other hand, in order to extract the shape of the target device more exactly, visibility information of the measurement target may be acquired by pixel to be used.

The visibility is a ratio of amplitude Bi (x,y) to average Ai (x,y). In general, the visibility increases when reflectivity increases. The visibility Vi (x,y) may be expressed as follows, $$Vi(x,y)=Bi(x,y)/Ai(x,y).$$

The grating pattern light may be projected onto the printed circuit board in various directions to acquire various kinds of pattern images. As shown in FIG. 1, the image storing section 500 extracts N-number of intensity signals $I^i_1, I^i_2, \ldots, I^i_N$ at a position i (x,y) in X-Y plane from N-number of pattern images captured by the camera 210, and the average Ai (x,y) and the visibility Vi (x,y) are calculated by using N-bucket algorithm.

For example, the visibility may be expressed as follows in case that N=3 and N=4, respectively.

In case that N=3, $$A_i(x, y) = \frac{I_1^i + I_2^i + I_3^i}{3},$$

$$V_i(x, y) = \frac{B_i}{A_i} = \frac{\sqrt{(2I_1^i - I_2^i - I_3^i)^2 + 3(I_2^i - I_3^i)^2}}{(I_1^i + I_2^i + I_3^i)}.$$

In case that N=4, $$A_i(x, y) = \frac{I_1^i + I_2^i + I_3^i + I_4^i}{4},$$

$$V_i(x, y) = \frac{B_i}{A_i} = \frac{2\sqrt{(I_1^i - I_3^i)^2 + (I_2^i - I_4^i)^2}}{(I_1^i + I_2^i + I_3^i + I_4^i)}.$$

The visibility information may be acquired by projecting grating pattern lights onto the measurement target in at least two directions, likewise a step of acquiring height information by pixels of the measurement target (step S120). That is, the visibility information by pixels may be easily acquired also from data of the target obtained by using, for example, the apparatus for measuring a three-dimensional shape in FIG. 1.

The contrast by pixels may be defined by a value obtained by multiplying the height information with the visibility information above. In general, when the reflectivity of a device is higher than environment, the visibility of the device is much greater than the visibility of the environment. Therefore, when the visibility information is reflected on the contrast map, the device may be emphasized in comparison with the contrast map on which only the height information is reflected.

Referring again to FIG. 2, then, information of the device 810, which corresponds to the shape template 800 in the measurement target, is acquired by comparing the contrast map of the measurement target with the shape template 800 (step S140). The information of the device 810 may include existence, a real size and a disposition status of the device 810, etc.

Figure 4:
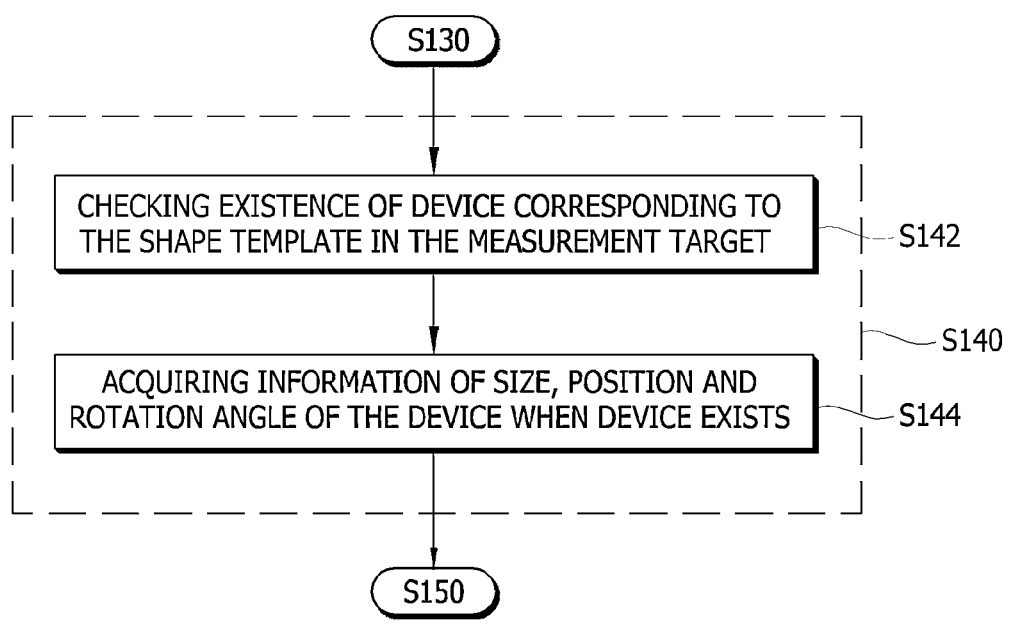
FIG. 4 is a flow chart showing a step of acquiring information of device (step S140) in FIG. 2 according to an exemplary embodiment of the present invention.

FIG. 4 is a flow chart showing a step of acquiring information of device (step S140) in FIG. 2 according to an exemplary embodiment of the present invention.

Referring to FIG. 4, in order to acquire the information of the device 810, which corresponds to the shape template 800 in the measurement target, existence of the device 810 corresponding to the shape template 800 is firstly checked in the measurement target (step S142).

For example, an inspection area (or region of interest) is set up and the existence of the target device in the inspection area is checked. In this case, the inspection area may be set up, for example, by using CAD information in which the shape of the measurement target is recorded. The CAD information includes design information of the measurement target. Alternatively, the inspection area may be set up by using studied information obtained in a studying mode. In the studying mode, a bare board of a printed circuit board is studied to get design standard information of the printed circuit board, and the studied information obtained in the studying mode may be used in setting up the inspection area.

Figure 5:
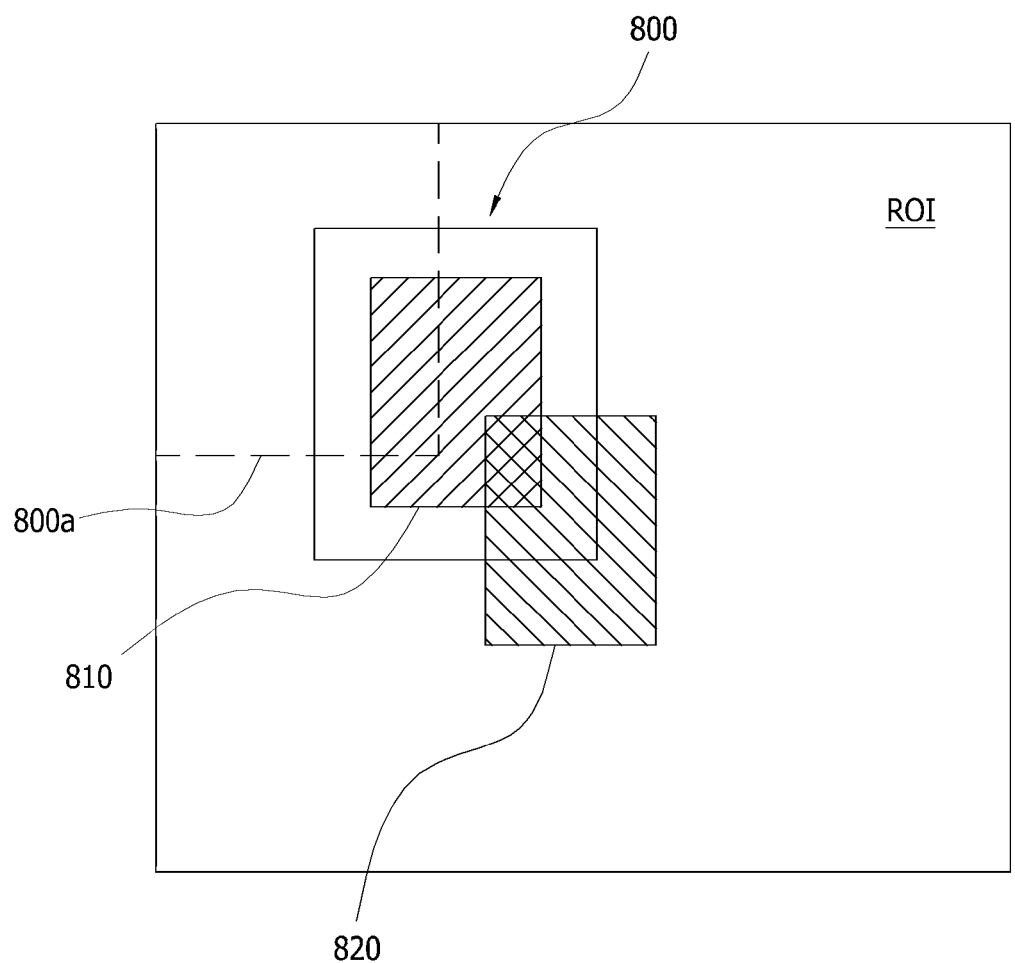
FIG. 5 is a conceptual view showing a method of comparing a target device with a device corresponding to a shape template.

FIG. 5 is a conceptual view showing a method of comparing a target device with a device corresponding to a shape template.

Referring to FIG. 5, in order to check if the target device 820 is the device 810 corresponding to the shape template 800, the inspection area ROI is set up first in the printed circuit board, and then the shape template 800 is compared with the contrast map while moving the shape template 800 from an initial position 800a in sequence.

In order to compare the shape template 800 with the contrast map, the value of zero or one in the shape template 800, which is allotted according to a coordinate of pixel, is multiplied by a contrast value of a region where the contrast map overlaps with the shape template 800 to get result values, and the result values are summed. Then, a position where the sum of the result values is maximum, is determined to be a preliminary position of the device 810. When the maximum sum of the result values is equal to or greater than a criterion, the target device 820 is determined to be the device 810 corresponding to the shape template 800.

The device 810 corresponding to the shape template 800 has a certain size. The target device 820 of the measurement target may have different size, and the target device 820 may be rotated. Therefore, a tolerance value may be provided in determining the device 810 recorded in the shape template 800 to be the target device 820, and the contrast map and the shape template 800 may be compared with each other in the tolerance value of the template determinant. For example, the tolerance value may be about 50% to about 150% of the device 810 corresponding to the shape template 800 in size. Additionally, an angle tolerance may be provided in determining the device 810 corresponding to the shape template 800 to be the target device 820, and the contrast map may be compared with the shape template 800 while rotating one of them.

Referring again to FIG. 4, then, when the device 810 exists in the measurement target, the information of size, position and rotation angle of the device (or the target device 820) may be acquired (step S144). The above information may be easily acquired through the contrast map.

After acquiring information of the device corresponding to the shape template 800 in the measurement target (step S140), the information of the device 810 may be used in various ways for a method for inspecting three dimensional shape.

For example, the device corresponding to the shape template 800 may be checked if the device is inferior one by using the information of the device (step S150). That is, the device may be checked if the device is inferior one by confirming that the device is properly disposed on the measurement target by using the size information, rotation information, etc. Additionally, information of other device or element may be obtained by eliminating the information of the device from the measurement target.

On the other hand, a portion of information of the device may be removed in the information of the device, and a remaining portion of information may be used for checking if the device is inferior one.

For example, when the device is a chip mounted on a printed circuit board, information of a terminal of a chip, in which information of a body of the chip is removed, or information of pad electrically connected to the terminal may be acquired without noise. Therefore, using the information above, the inferior one of the device may be checked.

As an exemplary embodiment, when the device is a chip mounted on a printed circuit board, a chip body of the chip is extracted first, chip body information regarding the chip body is removed from chip information regarding the chip, and then the chip mounted on the printed circuit board may be checked if the chip is inferior one by using the chip information in which the chip body information is removed. That is, a condition of connection between the terminal of the chip and the pad may be checked.

Hereinafter, the conventional two dimensional image (or picture) and the contrast map, on which height information (which corresponds to three dimensional information) is reflected, are compared referring to figures.

Figure 6:
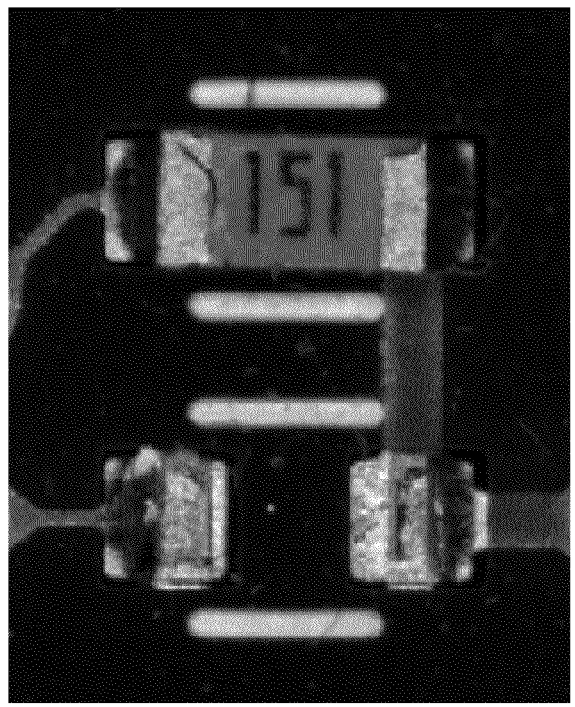
FIG. 6 is an image of a device, for example, when the device is a chip.

FIG. 6 is an image of a device, for example, when the device is a chip.

Referring to FIG. 6, a shape of a chip body in the image may be estimated to be a rectangle. However, a contour of the chip body cannot be clearly defined. Especially, it is not easy to find what region corresponds to chip body, and what region corresponds to a solder, a pad and a terminal.

Furthermore, the image is a two dimensional image (or a picture), so that number printed on the chip body and a portion with different color are displayed in the image.

Figure 7:
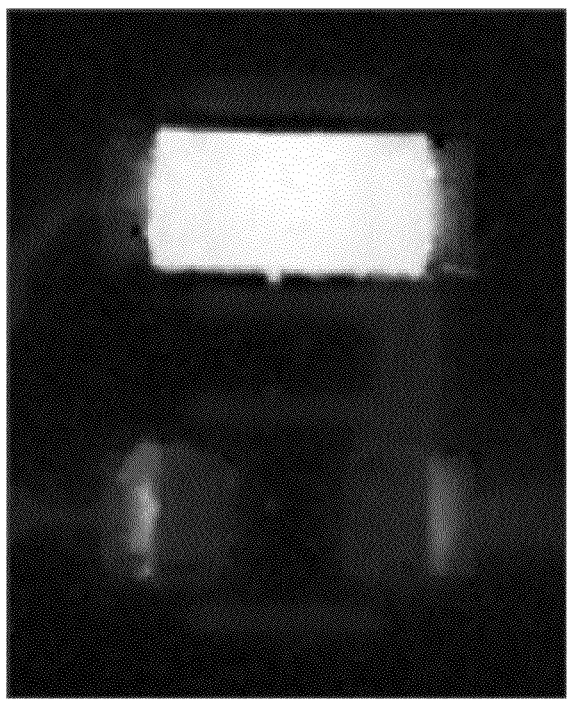
FIG. 7 is an image expressed by a contrast map of the chip in FIG. 6.

FIG. 7 is an image expressed by a contrast map of the chip in FIG. 6.

Referring to FIG. 7, a shape of a chip body in the image may be clearly shown to be a rectangle. The image in FIG. 7 is an image on which three dimensional information such as height information by pixel is reflected. In detail, the image in FIG. 7 is expressed to have a brighter contrast region in accordance with height. Therefore, the chip body with the same height is brightly expressed and the solder, the pad, the terminal, etc. which are lower than the chip body is darkly expressed, so that the chip body may be easily discriminated.

Furthermore, the height information is reflected on the image so that the color of the chip body, a number and a character printed on the chip body, etc., are not expressed in the image. Therefore, the color of the chip body and the number or the character printed on the chip body do not disturb in discriminating the chip body. Especially, even when the chip body has a complex color and complex character printed thereon, the shape of the chip body may be easily acquired by using the contrast map.

Figure 8:
FIG. 8 is an image expressed by a contrast map of the chip in FIG. 6, when visibility information is reflected.

FIG. 8 is an image expressed by a contrast map of the chip in FIG. 6, when visibility information is reflected.

Referring to FIG. 8, the shape of the chip body may be more clearly discriminated in FIG. 8. The image in FIG. 8 is the contrast map on which the visibility information is reflected, so that the chip body is emphasized to be more bright and other portions are expressed to be more dark. As a result, the chip body is emphasized, so that the shape of the chip body may be easily acquired.

As described above, according to the present embodiment, the device may be extracted by using the contrast map on which height information is reflected. Therefore, the method of the present invention is less sensitive to the color of the device and illumination than the conventional method using two dimensional image (or picture), so that the device may be easily discriminated even when the dimension of the device is changed.

Additionally, the method of the present invention is not affected by noise around the device, which is induced by patterns or silk screen patterns formed around the device, or noise of the device, which is induced by the camera. Even when other device, which may be confused with the device, is mounted, the device is compared with the template so that the device may be clearly discriminated.

Furthermore, the method may clearly discriminate the device even when the fillet of the device is small, since the method does not uses the fillet but the contrast map in discriminating the device.

Figure 9:
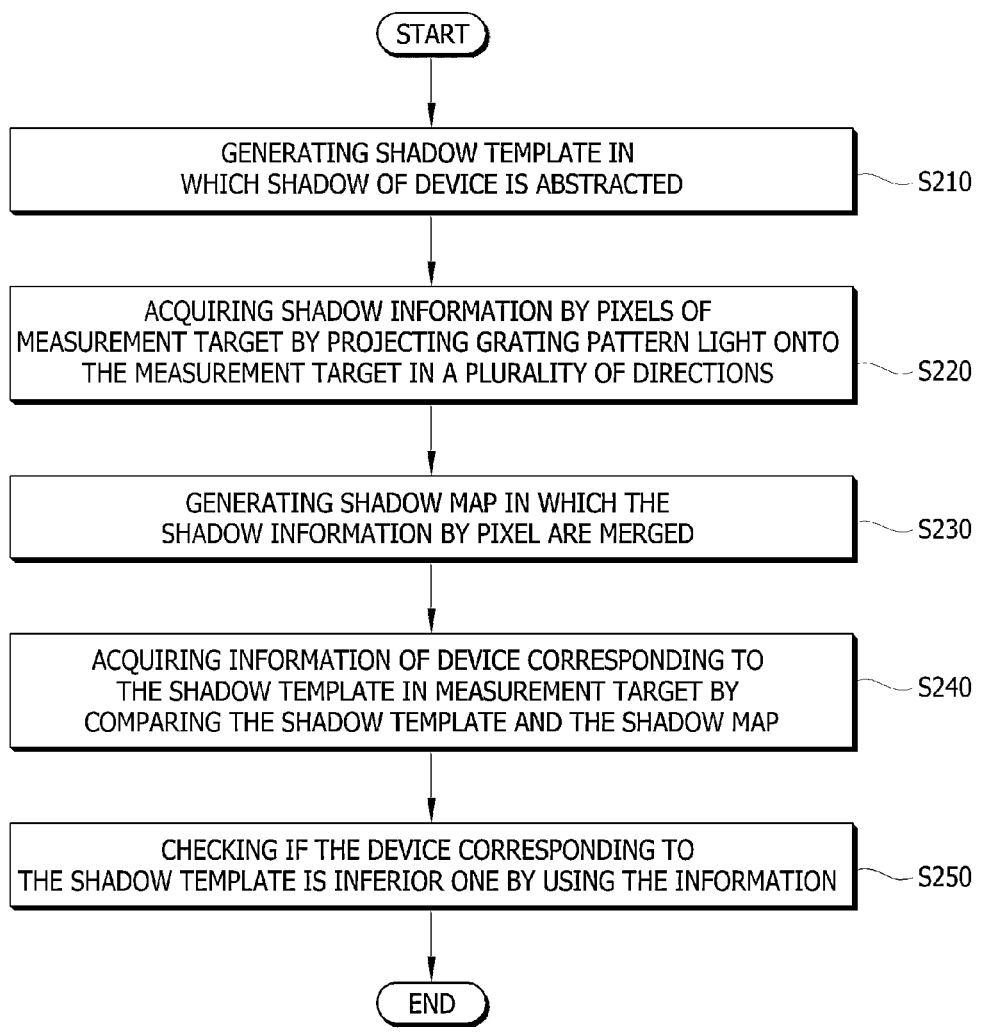
FIG. 9 is a flow chart showing a method for inspecting a three-dimensional shape according to another exemplary embodiment of the present invention.
Figure 10:
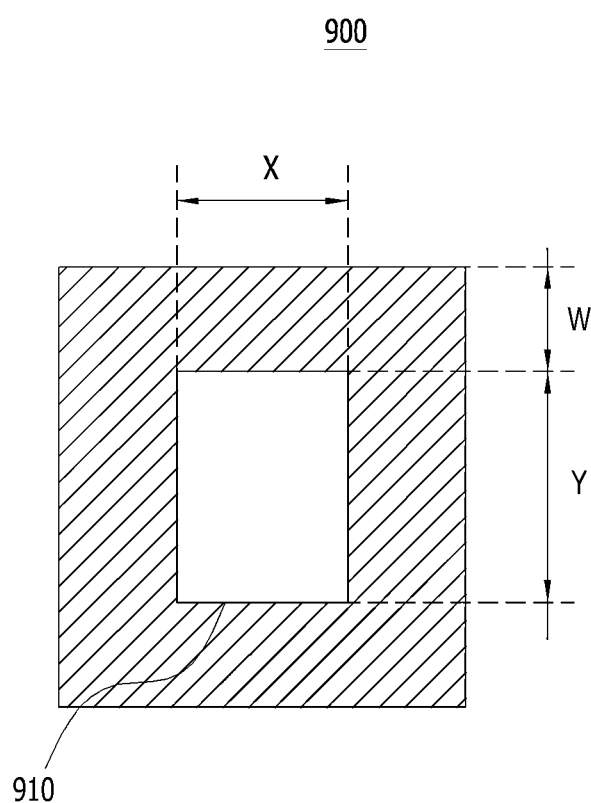
FIG. 10 is a conceptual view showing an example of a shadow template.

FIG. 9 is a flow chart showing a method for inspecting a three-dimensional shape according to another exemplary embodiment of the present invention, and FIG. 10 is a conceptual view showing an example of a shadow template.

Referring to FIG. 9 and FIG. 10, in order to inspect a device mounted on a printed circuit board, a shadow template 900, in which the shadow of the device is abstracted, is generated (step S210). The abstracted device 910 may includes a chip having, for example, a hexahedron shape.

For example, in abstracting the shadow of the device 910, which is generated when light is slantly irradiated onto the device, the shadow template 900 may be set up in advance such that a first region corresponding to the shadow of the device 910 may be expressed in white color and a second region not corresponding to the shadow of the device 910 may be expressed in black color as shown in FIG. 10. In FIG. 10, a hatched region corresponds to the shadow of the device 910. In this case, the shadow template 900 is generated in a digital image, and the first region may be set to correspond to one and the second region may be set to correspond to zero.

The shadow template 900 may be defined by a template determinant. That is, the template determinant may determine the shadow template 900. For example, when the device 910 is a chip with a hexahedron shape, the template determinant may include a dimension of the chip and a projecting angle of grating pattern image light. In detail, the template determinant may include a width X of the chip, a length Y of the chip and a height (not shown) of the chip corresponding to the dimension of the chip, and the shadow template 900 may be defined by the template determinant having the width, the length and the height of the chip.

Then, shadow information is acquired by pixels of the measurement target by projecting grating pattern light onto the measurement target in a plurality of directions (step S220).

The shadow information acquired by pixels of the measurement target may be calculated from data obtained by measuring the measurement target, for example, by using the apparatus for measuring a three-dimensional shape in FIG. 1.

Then, a shadow map, in which shadow information obtained in various directions are merged, is generated (step S230). For example, according to apparatus for measuring a three-dimensional shape, which measures a comparison target device (Hereinafter, referred to as "target device") in four directions by slantly projecting the target device, shadows of the target device is generated in four directions, and the shadows in four directions are merged to generate the shadows map surrounding the target device. For example, the shadow map may be formed such that one is assigned when there is a shadow and zero is assigned when there is not a shadow according to a pixel coordinate.

The shadow map is independent from measurement height range so that information of the device 910, such as a position, a size, a rotation angle, etc., may be acquired regardless of the height of the device, even when the height of the device exceeds the measurement height range of the apparatus for measuring a three-dimensional shape.

In this case, the shadow map is generated according to the shadow information. Therefore, the shadow map is independent from a color of the target device, or a character or a figure printed on the target device. Furthermore, the shadow map is independent from a color, a character or a figure of environment of the target device. That is, the shadow map represents only gray scale of the target device according to existence of the shadow of the target device. Therefore, the shape of the target device may be extracted more exactly in comparison with a conventional two dimensional image.

On the other hand, in order to extract the shape of the target device more exactly, visibility information of the measurement target may be acquired by pixel to be used as described referring to FIG. 2 and FIG. 3.

The visibility information may be acquired by projecting grating pattern lights onto the measurement target in a plurality of directions, likewise a step of acquiring shadow information by pixels of the measurement target (step S220). That is, the visibility information by pixels may be easily acquired also from data of the target obtained by using, for example, the apparatus for measuring a three-dimensional shape in FIG. 1.

Figure 11:
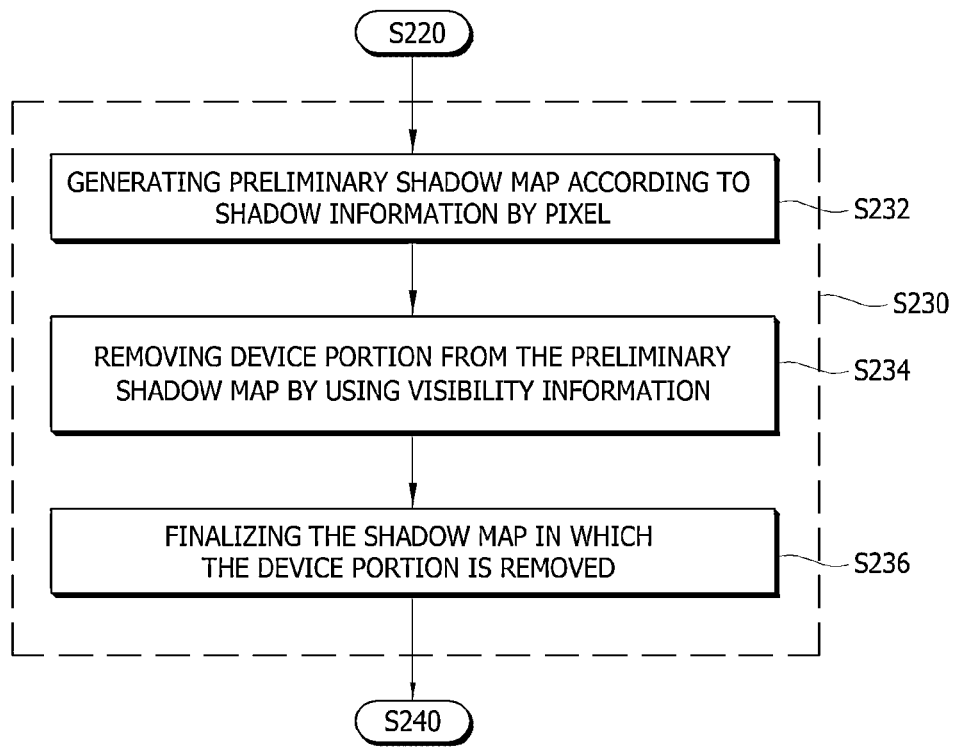
FIG. 11 is a flow chart showing a step of generating a shadow map by using visibility information (step S230) in FIG. 9 according to another exemplary embodiment of the present invention.

FIG. 11 is a flow chart showing a step of generating a shadow map by using visibility information (step S230) in FIG. 9 according to another exemplary embodiment of the present invention.

Referring to FIG. 11, in order to generate the shadow map, a preliminary shadow map is generated first according to the shadow information by each pixel (step S232). Then, the device portion is removed from the preliminary shadow map by using the visibility information (step S234). Then, the shadow map in which the device portion is removed is finalized (step S236).

In general, when the reflectivity of a device is higher than environment, the visibility of the device is much greater than the visibility of the environment. Therefore, when the visibility information is reflected on the shadow map, the shadow may be clearly discriminated even when the device has a black color that is similar to a color of the shadow.

Referring again to FIG. 9, then, information of the device 910, which corresponds to the shadow template 900 in the measurement target, is acquired by comparing the shadow map of the measurement target with the shadow template 900 (step S240). The information of the device 910 may include existence, a real size and a disposition status of the device 910, etc.

Figure 12:
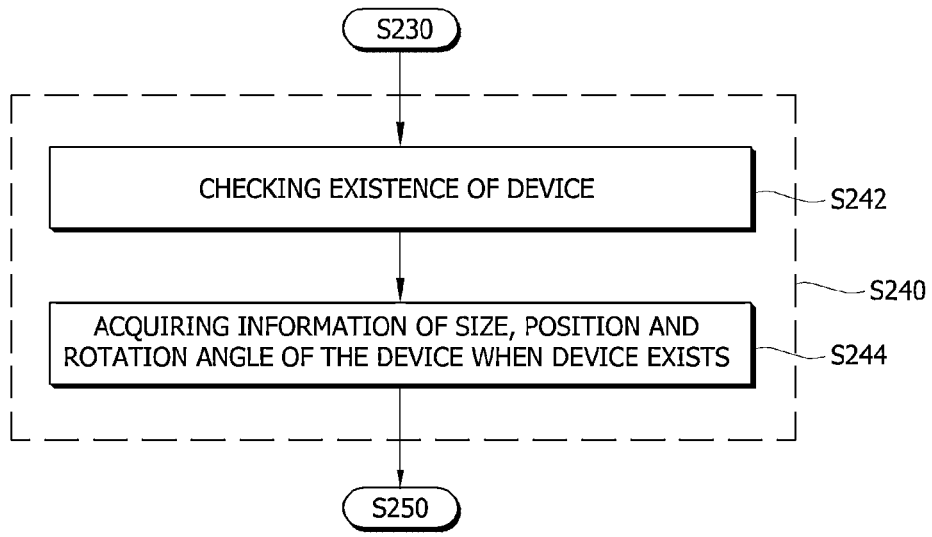
FIG. 12 is a flow chart showing a step of acquiring device information (step S240) in FIG. 9.

FIG. 12 is a flow chart showing a step of acquiring device information (step S240) in FIG. 9.

Referring to FIG. 9 and FIG. 12, in order to acquire the information of the device 910, which corresponds to the shadow template 900 in the measurement target, existence of the device 910 corresponding to the shadow template 900 may be firstly checked in the measurement target (step S242).

For example, an inspection area (or region of interest) is set up and the existence of the target device in the inspection area is checked. In this case, the inspection area may be set up, by the same method described referring to FIG. 4.

Figure 13:
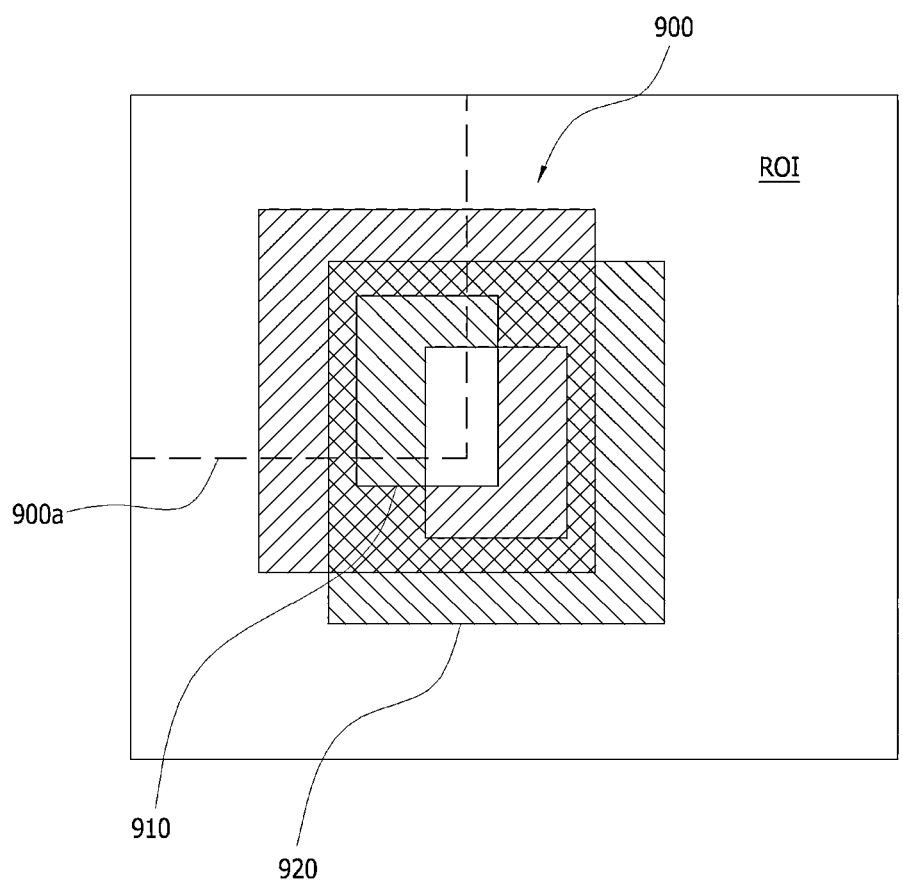
FIG. 13 is a conceptual view showing a method of comparing a target device with a device corresponding to a shadow template.

FIG. 13 is a conceptual view showing a method of comparing a target device with a device corresponding to a shadow template.

Referring to FIG. 13, in order to check if the target device 920 is the device 910 corresponding to the shadow template 900, the inspection area ROI may be set up first in the printed circuit board, and then the shadow template 900 may be compared with the shadow map while moving the shadow template 900 from an initial position 900a in sequence.

In order to compare the shadow template 900 with the shadow map, the value of zero or one in the shadow template 900, which is allotted according to a coordinate of pixel, is multiplied by the value of zero or one in the shadow map, which is allotted according to the coordinate of the pixel to get result values, and the result values are summed. In this case, when a region where the hatched region of the shadow template 900 in FIG. 13 overlaps with the hatched region of the shadow map increases in size, the result value becomes greater. Then, a position where the sum of the result values is maximum, is determined to be a preliminary position of the device 910. When the region where the hatched region of the shadow template 900 in FIG. 13 overlaps with the hatched region of the shadow map is maximum in size, the result value becomes maximum and the shadow template 900 and the shadow map are substantially coincide with each other. Then, when the maximum sum of the result values is equal to or greater than a criterion, the target device 920 is determined to be the device 910 corresponding to the shadow template 900. For example, the criterion may be set to a number obtained by multiplying the number one in the shadow template 900 with a specific value.

The device 910 corresponding to the shadow template 900 has a certain size. The target device 920 of the measurement target may have different size, and the target device 920 may be rotated. Therefore, a tolerance value may be provided in determining the device 910 recorded in the shadow template 900 to be the target device 920, and the shadow map and the shadow template 900 may be compared with each other in the tolerance value of the template determinant. For example, the tolerance value may be about 50% to about 150% of the device 910 corresponding to the shadow template 900 in a horizontal length X, a vertical length Y and a width W. In this case, the width W may be substantially the same in all direction, but may be different according to directions. Additionally, an angle tolerance may be provided in determining the device 910 corresponding to the shadow template 900 to be the target device 920, and the shadow map may be compared with the shadow template 900 while rotating one of them.

Referring again to FIG. 12, then, when the device 910 exists in the measurement target, the information of size, position and rotation angle of the device (or the target device 920) may be acquired (step S244). The above information may be easily acquired through the shadow map.

After acquiring information of the device corresponding to the shadow template 900 in the measurement target (step S240), the information of the device 910 may be used in various ways for a method for inspecting three dimensional shape.

For example, the device corresponding to the shadow template 900 may be checked if the device is inferior one by using the information of the device (step S250).

The step S250 is substantially the same as the step of S150 in FIG. 2, thus any further explanation will be omitted.

As described above, according to the present embodiment, the device may be extracted by using the shadow map on which shadow information is reflected. Therefore, the method of the present invention is less sensitive to the color of the device and illumination than the conventional method using two dimensional image (or picture), so that the device may be easily discriminated even when the dimension of the device is changed.

Additionally, the method of the present invention is not affected by noise around the device, which is induced by patterns or silk screen patterns formed around the device, or noise of the device, which is induced by the camera. Even when other device, which may be confused with the device, is mounted, the device is compared with the template so that the device may be clearly discriminated.

Furthermore, the shadow is independent from measurement height range so that information of the device, such as a position, a size, a rotation angle, etc., may be acquired regardless of the height of the device, even when the height of the device exceeds the measurement height range of the apparatus for measuring a three-dimensional shape.

Figure 14:
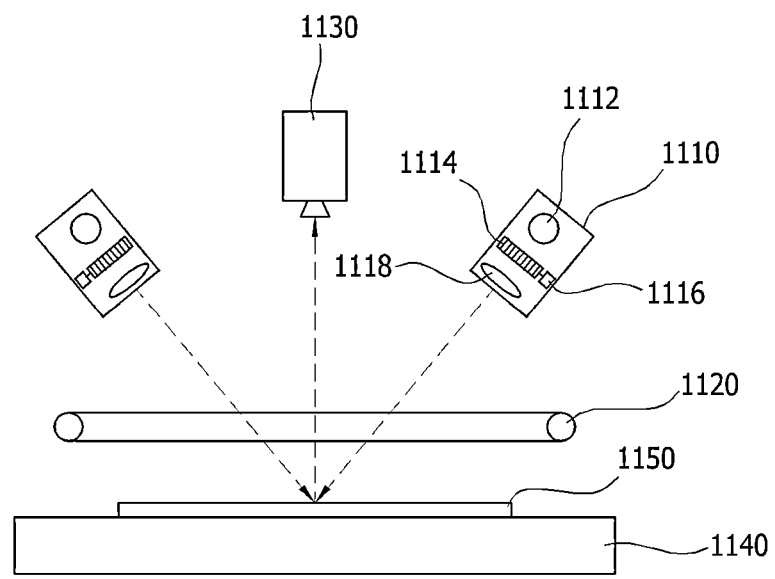
FIG. 14 is a schematic view showing an apparatus for measuring a three-dimensional shape, which may be used for a method for inspecting a measurement object according to an exemplary embodiment of the present invention.

FIG. 14 is a schematic view showing an apparatus for measuring a three-dimensional shape, which may be used for an inspection method for a three dimensional shape according to an exemplary embodiment of the present invention.

Referring to FIG. 14, an apparatus for measuring a three-dimensional shape according to an exemplary embodiment of the present invention includes a stage 1140, at least one projecting section 1110 and a camera 1130. The state 1140 supports and transfers a substrate 1150 on which a measurement object is formed. The at least one projecting section 1110 projects grating pattern light onto the substrate 1150. The camera 1130 captures an image of the substrate 1150. The apparatus for measuring a three-dimensional shape may further include an illuminating section 1120 for irradiating light onto substrate 1150, separated from the projecting section 1110. The illuminating section 1120 is disposed adjacent to the stage 1140.

The projecting section 1110 is used for measuring three dimensional shape of the measurement object on the substrate 1150. In order for that, the projecting section 1110 slantly projects grating pattern light onto the substrate 1150. For example, the projecting section 1110 includes a light source 1112, a grating unit 1114, a grating transfer unit 1116 and a focusing lens 1118. The light source 1112 generates light. The grating unit 1114 converts light generated by the light source 1112 into grating pattern light. The grating transfer unit 1116 transfers the grating unit 1114 by a specific distance. The focusing lens 1118 focuses the grating pattern light converted by the grating unit 1114 onto the measurement object. The grating unit 1114 may be transferred by 2π/N (N is an integer number) for phase shifting by the grating transfer unit 1116 such as a piezo actuator (PZT). The projecting section 1110 having the above elements projects grating pattern light toward the substrate 1150 at times when the grating unit 1114 is transferred by the grating transfer unit 1116, step by step and the camera 1130 captures an image of the substrate 1150 when the projecting section 1110 projects the grating pattern light.

In order to improve measurement accuracy, a plurality of the projecting sections 1110 may be disposed along a circumference of a circle with the camera 1130 disposed at a center thereof by a specific angle. For example, four projecting sections 1110 may be disposed at the circumference of a circle by ninety degrees with respect to the camera 1130, or eight projecting sections 1110 may be disposed at the circumference of a circle by forty five degrees with respect to the camera 1130.

The illuminating section 1120 has a circular shape, and may be disposed adjacent to the stage 1140. The illuminating section 1120 irradiates light toward the substrate 1150 for checking an initial alignment or setting up an inspection area. For example, the illuminating section 1120 may include a fluorescent lamp emitting white light. Alternatively, the illuminating section 1120 may include a red LED emitting red light, a green LED emitting green light and a blue LED emitting blue light.

The camera 1130 is disposed over the stage 1140, and receives light reflected by the substrate 1150 to capture an image of the substrate 1150. For example, the camera 1130 captures a grating pattern image reflected by the substrate 1150 when the projecting section 1110 projects grating pattern light onto the substrate 1150, and an image of the substrate 1150 when illuminating section 1120 irradiates light onto the substrate 1150. The camera 1130 may include a CCD camera or a CMOS camera for capturing an image.

The apparatus for measuring a three-dimensional shape, which has above explained structure, emits grating pattern light or light by using the projecting section 1110 or the illuminating section 1120 onto the substrate 1150, and captures the grating pattern image or the image reflected by the substrate 1150 by using the camera 1130 to measure three-dimensional image or two dimensional image, respectively. The apparatus for measuring a three-dimensional shape in FIG. 14 is only an example, and various modifications of the apparatus for measuring a three-dimensional shape may be possible.

Hereinafter, a method for inspecting a device mounted on a printed circuit board by using the apparatus for measuring a three-dimensional shape, which is described above, will be explained.

Figure 15:
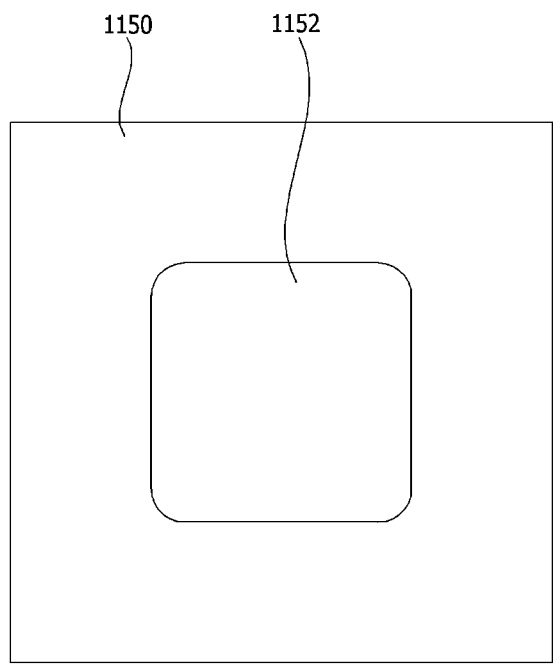
FIG. 15 is a plan view showing a portion of a substrate, on which a measurement object is mounted.
Figure 16:
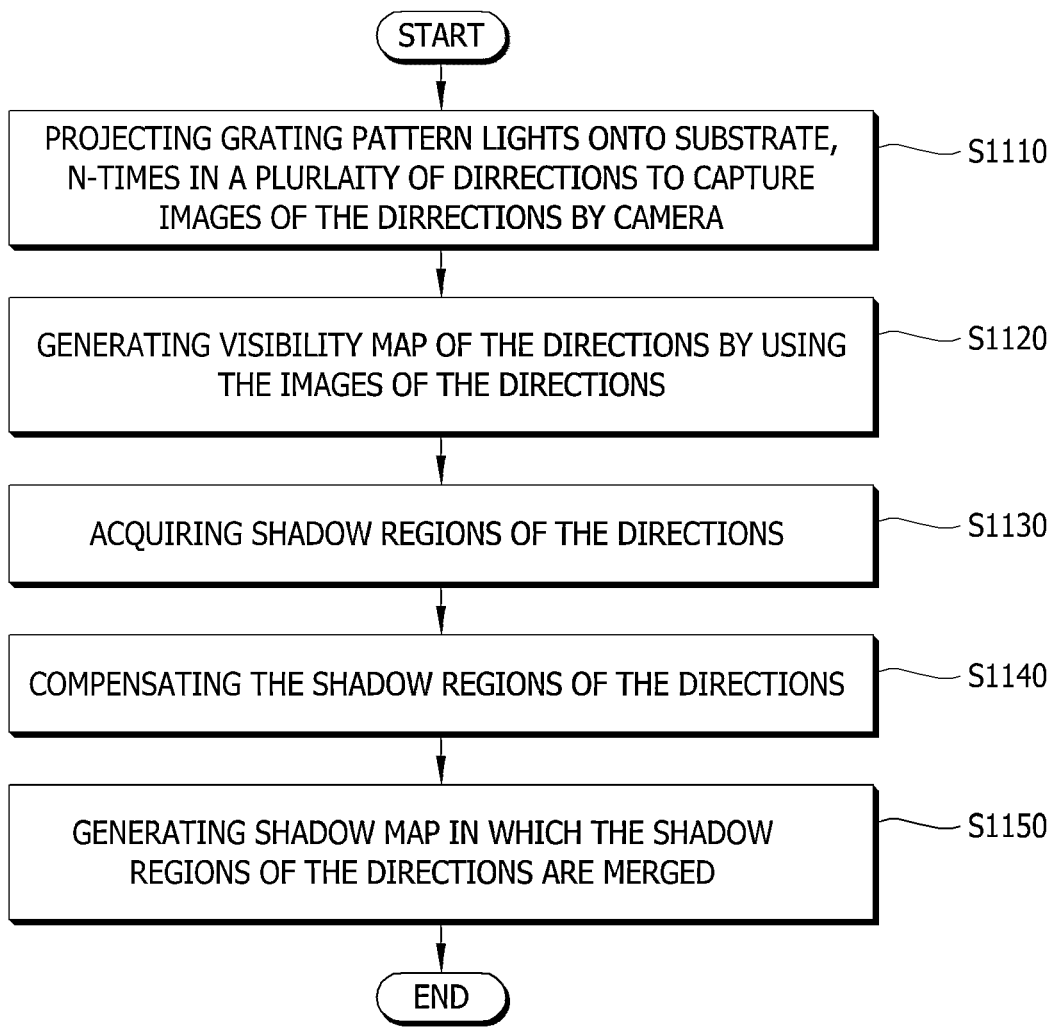
FIG. 16 is a flow chart showing a method for inspecting a measurement object according to still another exemplary embodiment of the present invention.
Figure 17:
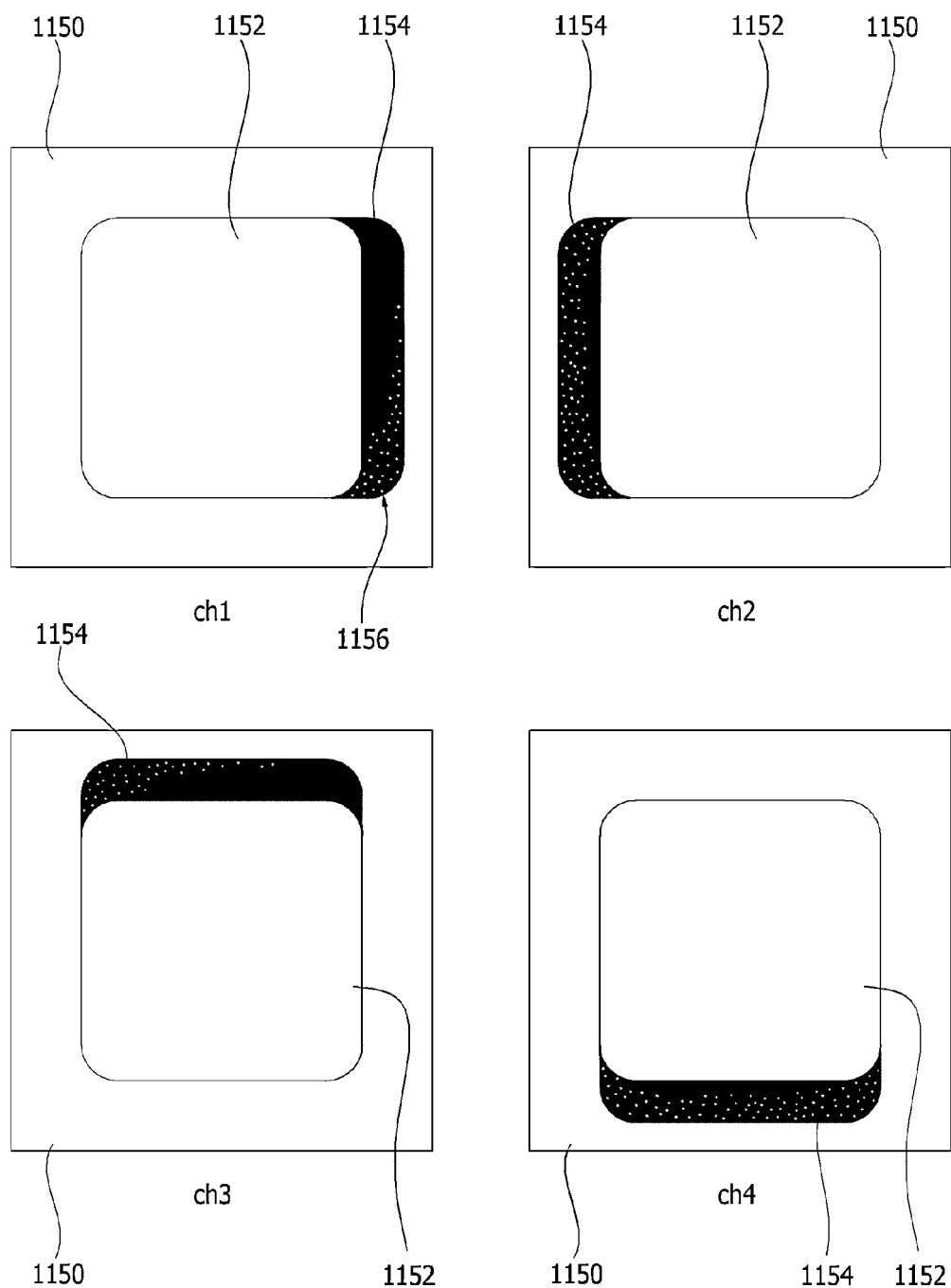
FIG. 17 is a figure showing visibility maps of a plurality of directions.
Figure 18:
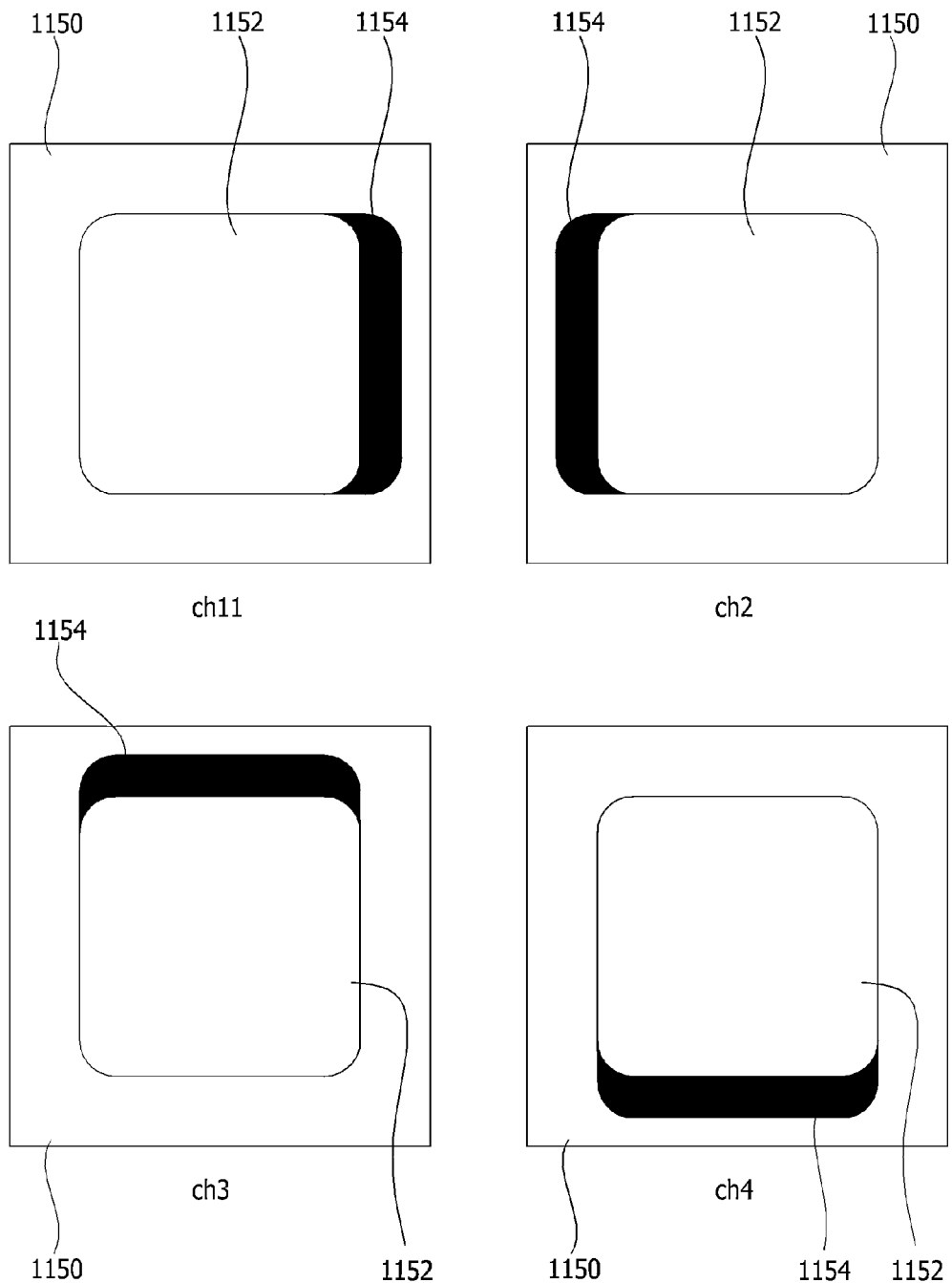
FIG. 18 is a figure showing amplitude maps of a plurality of directions.
Figure 19:
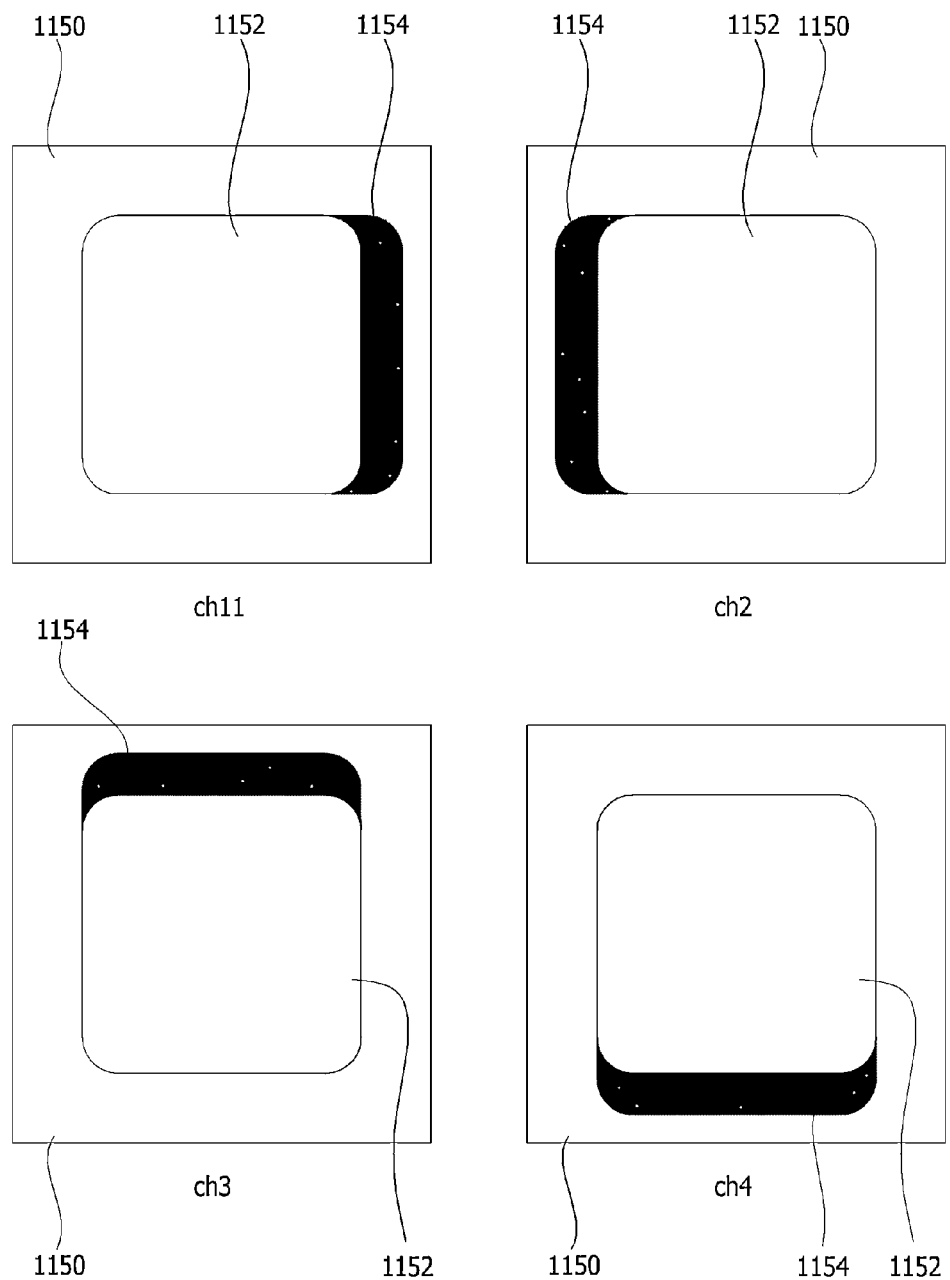
FIG. 19 is a figure showing compensation maps of a plurality of directions, in which shadow regions of a plurality of directions are compensated.
Figure 20:
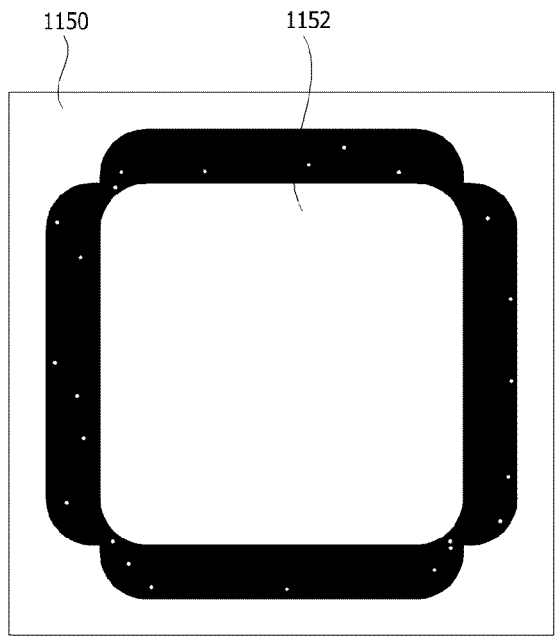
FIG. 20 is a figure showing a shadow map in which compensated shadow regions of a plurality of directions are merged.

FIG. 15 is a plan view showing a portion of a substrate, on which a measurement object is mounted, FIG. 16 is a flow chart showing a method for inspecting a measurement object according to still another exemplary embodiment of the present invention, FIG. 17 is a figure showing visibility maps of a plurality of directions, FIG. 18 is a figure showing amplitude maps of a plurality of directions, FIG. 19 is a figure showing compensation maps of a plurality of directions, in which shadow regions of a plurality of directions are compensated, and FIG. 20 is a figure showing a shadow map in which compensated shadow regions of a plurality of directions are merged.

Referring to FIG. 14, FIG. 15 and FIG. 16, in order to inspect the mounting status of a measurement object 1152 such as an electronic device on a substrate 1150, grating pattern light is projected onto the substrate 1150, on which the measurement object 1152 is mounted, N-times in a plurality of directions, respectively and images of the substrate 1150 are captured by the camera 1130 (step S1110). Here, N is an integer greater than two. Then, visibility maps of the directions are generated using N-number of images captured by the camera 1130 in the plurality of directions (step S1120).

In detail, when a plurality of projecting sections 1110 projects grating pattern light onto the substrate 1150 in sequence, the camera 1130 captures images in sequence to generate the visibility maps of the directions. In this case, the apparatus for measuring a three-dimensional shape may acquire images of the directions through a multi-channel phase shift moiré method. For example, each of the projecting sections 1110 projects grating pattern light onto the substrate 1150 while shifting the grating pattern light several times, and the camera 1130 captures phase shifted images of the substrate 1150 to generate the visibility maps of the directions from the phase shifted images. On the other hand, amplitude maps of the directions may be generated from the phase shifted images.

The visibility map may be generated by using amplitude Bi (x,y) and average Ai (x,y) of intensity of captured image. The visibility is the same as described referring to FIG. 2 and FIG. 3. Thus, any further explanation will be omitted.

The apparatus for measuring a three-dimensional shape may generate visibility maps of a plurality of directions in FIG. 17 and amplitude maps of a plurality of directions in FIG. 18 by using the visibility information and the amplitude information.

Referring to FIG. 19, when the visibility maps of a plurality of directions are generated, shadow regions 1154 of four directions, which regards to the measurement object 1152, is acquired from the visibility maps of a plurality of directions (step S1130). The measurement object 1152 mounted on the substrate 1150 has a certain height. Therefore, when the projecting section 1110 projects grating pattern light toward the measurement object 1152, a shadow region 1154 is generated at a side that is opposite to the projecting section 1110 with respect to the measurement object 1152. For example, the shadow region 1154 is relatively dark in comparison with other regions, so that the shadow region 1154 is displayed in black in visibility maps of the directions and amplitude maps of the directions.

Then, the shadow regions 1154 of the directions, which are acquired through the above process, are compensated (step S1140). The visibility (Vi (x,y)) may be a large number in a region where the average (Ai (x,y)) is very small, for example, (0.xxx) even through the amplitude Bi (x,y) is small, so that a noise region 1156 where a real shadow region 1154 is brightly displayed as shown in FIG. 17 may be generated. Therefore, in order to remove the noise region 1156, shadow regions 1154 of the directions are compensated. According to one exemplary embodiment for compensating the shadow regions 1154 of the directions, the each pixel of the shadow regions 1154 of the directions is multiplied by the amplitude Bi (x,y). According to another exemplary embodiment for compensating the shadow regions 1154 of the directions, a pixel of the shadow regions 1154 of the directions is set up to be a shadow when the amplitude Bi (x,y) of the pixel is no greater than a criterion that is previously set up.

By compensating the shadow regions 1154 of the directions through the above described method, most of the noise regions 1156 of the shadow regions 1154 of the directions may be removed, so that more reliable shadow regions 1154 of the directions may be acquired. Additionally, a region of a measurement object may be exactly extracted using the visibility map even when the height of the device exceeds the measurement height range of the apparatus for measuring a three-dimensional shape.

When the shadow regions 1154 of the directions are compensated, the compensated shadow regions 1154 of the directions, which are compensated, are merged to generate a shadow map as shown in FIG. 20 (step S1150). A real measurement object 1152 and the shadow region 1154 neighboring the measurement object 1152 have relatively greater gray scale difference on the shadow map. Therefore, region of the measurement object 1152 may easily set up. For example, the measurement object 1152 may be displayed in a bright color and the shadow region 1154 may be displayed in a dark color in the shadow map. On the contrary, the measurement object 1152 may be displayed in a dark color and the shadow region 1154 may be displayed in a bright color in the shadow map.

Compensating the shadow regions may be performed after acquiring the shadow regions of the directions from the visibility maps of the directions (step S1130). Alternatively, a merged shadow region may be compensated in the shadow map after the shadow regions of the directions are merged to generate the shadow map (step S1150).

Then, a mounting status of the measurement object 1152 may be checked by using the shadow map. In detail, information of a size, a position and a rotation of the measurement object 1152 are acquired from the shadow map, and mounting status of the measurement object 1152 may be checked using at least one of the information. For example, CAD data, in which basic information of the substrate is contained, includes information of a size, a position and a rotation of the measurement object 1152. Therefore, mounting status of the measurement object 1152 may be checked by comparing the information of the CAD data with the information of the shadow map.

Additionally, a step for generating a template for confirming the measurement object 1152 by being compared with the shadow map may be added. The template may be generated through the information of the measurement object 1152 or through measuring performed by measuring apparatus, and the template may be stored to be used. In comparing the shadow map with the template, when a difference between the shadow map and the template is within a tolerance, the measurement object is confirmed. In this case, the tolerance may be set up by a user.

In the present embodiment, grating pattern lights are projected of a plurality of directions or four projecting sections 1110 are used. However, the number of direction in which the grating pattern light is projected is not limited to four but may be variable.

Figure 21:
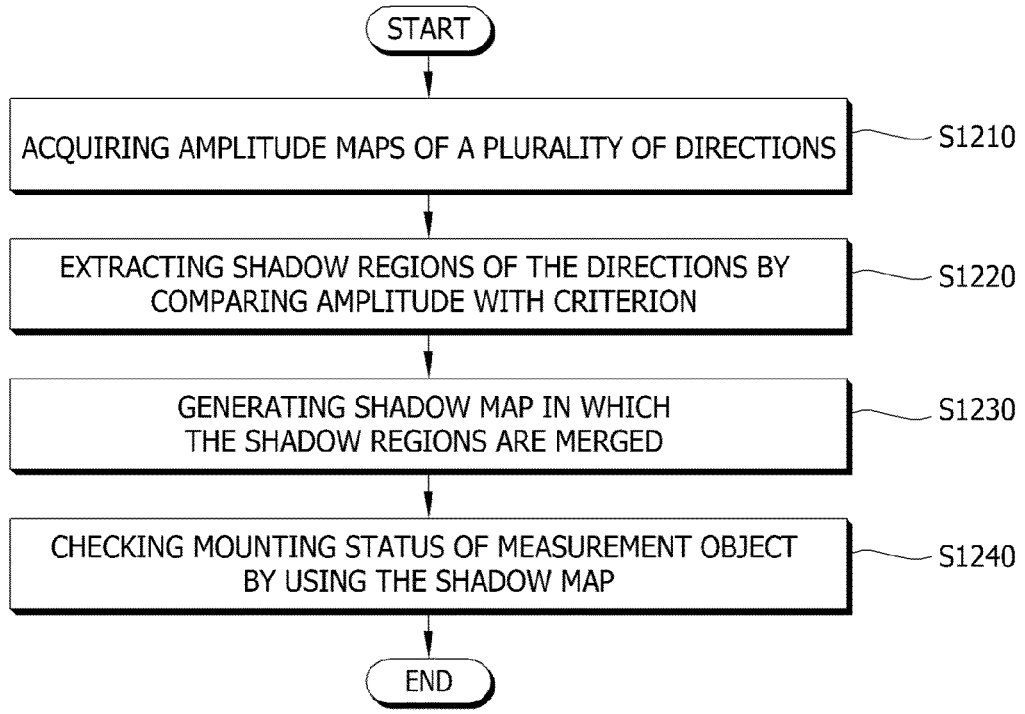
FIG. 21 is a flow chart showing a method for inspecting a measurement object according to still another exemplary embodiment of the present invention.

FIG. 21 is a flow chart showing a method for inspecting a measurement object according to still another exemplary embodiment of the present invention.

Referring to FIG. 21, in order to inspect mounting status of the measurement object 1152, grating pattern lights are projected onto the substrate 1150, on which the measurement object 1152 is mounted, in a plurality of directions to acquire amplitude maps of the directions as shown in FIG. 18 (step S1210). The method of acquiring the amplitude maps of a plurality of directions is previously described. Thus, any further explanations will be omitted.

Then, regions in the amplitude maps of a plurality of directions, in which amplitude is no greater than a criterion which is previously set up, are determined to a shadow region, and shadow regions 1154 of the directions are extracted (step S1220). In general, the shadow region has relatively lower amplitude than other region. Therefore, a region having lower amplitude than a criterion may be considered as the shadow region. As described above, when the shadow regions are extracted using the amplitude maps of the directions having less noise than the visibility maps of the directions, a reliability of the shadow region may be enhanced.

Then, the shadow regions 1154 of the directions are merged to generate a shadow map (step S1230). The shadow map is previously explained referring to FIG. 20. Thus, any further explanation will be omitted. Furthermore, in the present embodiment, a step of inspecting of mounting status of the measurement object using the shadow map and a step of generating template may be included.

On the other hand, in generating the shadow map, instead of using the visibility maps of the directions or the amplitude maps of the directions as described previously, a plurality of grating pattern images of the directions may be converted into a 2D image, and the shadow map may be generated using the 2D image. In converting the plurality of grating pattern images into the 2D image, grating pattern may be displayed in the 2D image. The grating pattern in the 2D image may be removed by averaging the grating pattern images, adding two intensities of the plurality of grating pattern images, of which phase difference is 180°, or summing up intensities of some images in the N-number of images such that sum of phase differences of the images becomes 360°.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An inspection method for inspecting a device mounted on a substrate, comprising:
   generating a shape template of the device;
   acquiring shadow information of each pixel by projecting light onto the substrate in a plurality of directions;

generating a shadow map by merging a plurality of shadow information taken in a plurality of directions; and comparing the shadow map with the shape template to acquire at least one information of a size, a position and a rotation of the device.

2. The inspection method of claim 1, wherein acquiring shadow information of each pixel by projecting light onto the substrate in a plurality of directions, comprises:

projecting grating pattern light onto the substrate in a plurality of directions N-times, while shifting a phase of the grating pattern light; and capturing N-number of images reflected by the substrate.

3. The inspection method of claim 2, wherein acquiring shadow information of each pixel by projecting light onto the substrate in a plurality of directions, further comprises:

averaging the N-number of images or summing up images in the N-number of images such that sum of phase differences of the images becomes 360 degrees, to get images in which grating pattern is removed.

4. An inspection method for a measurement object, comprising:

acquiring shadow regions for each direction by projecting light onto a substrate, on which the measurement object is formed, in a plurality of directions;

generating a shadow map by merging the acquired shadow regions for each direction; and acquiring at least one information of a size, a position and a rotation of the measurement object from the shadow map.

5. The inspection method of claim 4, after acquiring shadow areas for each direction, further comprising compensating the acquired shadow regions for each direction, wherein compensating the acquired shadow regions for each direction is performed by multiplying amplitude ((Bi(x,y)) with each pixel of the acquired shadow regions for each direction, or setting up a pixel of the shadow regions to be a shadow when the amplitude of the pixel is no greater than a criterion that is previously set up.

6. The inspection method of claim 4, after generating a shadow map, further comprising compensating the shadow map, wherein compensating the shadow map is performed by multiplying amplitude ((Bi(x,y)) with each pixel of the shadow map, or setting up a pixel of the shadow map to be a shadow when the amplitude of the pixel is no greater than a criterion that is previously set up.

7. The inspection method of claim 4, further comprising:

generating a template by measuring the measurement object using a measurement apparatus, or CAD data including information of the measurement object; and setting up the measurement object by comparing the shadow map with the template.

8. The inspection method of claim 4, further comprising generating a shadow template that is abstracted from a shadow of the measurement object, wherein, in acquiring at least one information of a size, a position and a rotation of the measurement object from the shadow map, the information of the measurement object is acquired by comparing the shadow map with the shadow template.

9. The inspection method of claim 4, in acquiring shadow areas for each direction, wherein visibility information or amplitude information for each pixel is acquired by projecting the light onto the substrate, on which the measurement object is formed, and the shadow regions for each direction is acquired from the visibility information or the amplitude information.

10. The inspection method of claim 9, wherein the visibility is defined as a ratio of amplitude ($B_i(x,y)$) to average ($A_i(x,y)$) (or ($Vi(x,y)=Bi(x,y)/Ai(x,y)$)) in intensity of image at each pixel, where the average ($A_i(x,y)$) and the visibility ($Vi(x,y)$) are as follows:

$$A_i(x, y) = \frac{I_1^i + I_2^i + I_3^i + I_4^i}{4}$$

$$V_i(x, y) = \frac{B_i}{A_i} = \frac{2\sqrt{(I_1^i - I_3^i)^2 + (I_2^i - I_4^i)^2}}{(I_1^i + I_2^i + I_3^i + I_4^i)}$$

(wherein $I^i_1, I^i_2, \ldots, I^i_N$ indicate N-number of intensity signals at a position i (x,y) in X-Y plane, which are extracted from N-number of pattern images captured by a camera, and N is four).

* * * * *